Jan. 16, 1934.  E. HOPKINSON  1,943,439
MANUFACTURE OF FILAMENTARY MATERIALS
Original Filed June 15, 1931
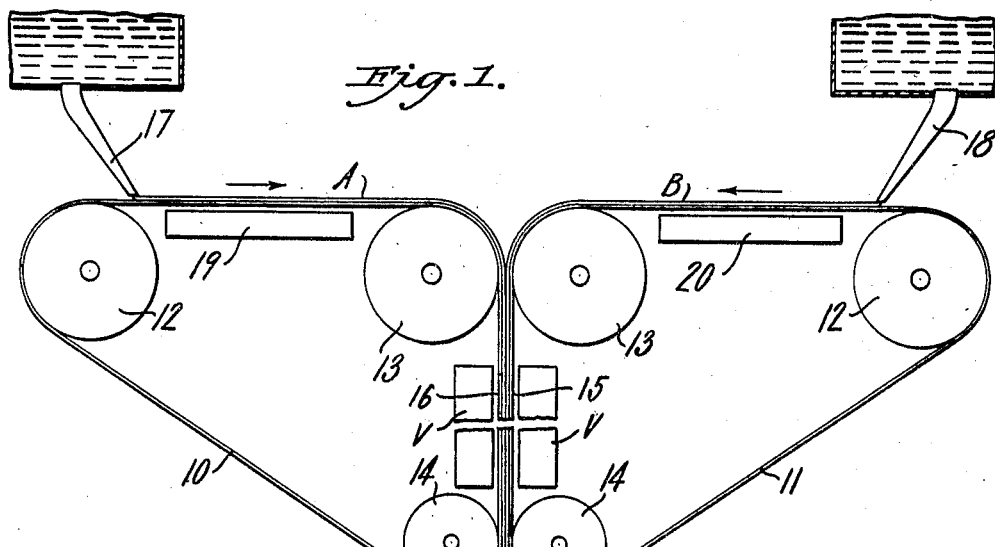
Fig. 1.
Fig. 2.
Fig. 3.
Fig. 4.
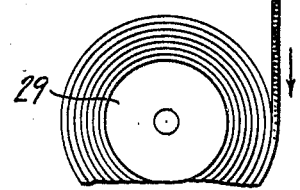
INVENTOR
ERNEST HOPKINSON
BY
ATTORNEY Patented Jan. 16, 1934

1,943,439

UNITED STATES PATENT OFFICE 1,943,439

MANUFACTURE OF FILAMENTARY MATERIALS

Ernest Hopkinson, New York, N. Y., assignor to National India Rubber Company, Providence, R. I., a corporation of Rhode Island Application June 15, 1931, Serial No. 544,431
Renewed June 17, 1933

15 Claims. (Cl. 18—54)

This invention relates to the manufacture of rubber thread, and has for an object the production of such thread from any suitable rubber compound, preferably as aqueous dispersions of rubber, such as latex, either natural or artificial.

Various other objects and advantages of the invention will appear from the following specification, reference being made to the accompanying drawing, in which:

Figure 1 is an elevation partly in section of apparatus embodying the invention, and Figs. 2, 3 and 4 are cross sections respectively on the lines 2—2, 3—3 and 4—4 of Fig. 1.

In carrying out the invention there may be provided a pair of continuous drying bands 10 and 11, each mounted upon a series of suitable supports or drums 12, 13 and 14 arranged to present portions of the two bands in close parallel opposition, as indicated at 15 and 16, whereby a relatively narrow passage is provided between the two bands at this point. Suitable rubber compound in liquid form issues from flat nozzles 17 and 18 respectively, to form films or strips A and B upon the two bands 10 and 11 which are continuously driven at the same speed in opposite directions as indicated by the arrows, so that the two strips of rubber compound A and B are carried through the passage defined by opposed portions 15 and 16 of the bands which are properly spaced to bring the two strips into mutual and intimate contact to form a plied strip. Any appropriate means may be employed for driving the bands. For instance, the two drums 13 may be geared together, or otherwise synchronized and rotated by an electric motor.

The rubber composition is preferably in the form of aqueous dispersions of latex, compounded with suitable vulcanizing ingredients so introduced or incorporated in the rubber that not more than a part of a complete vulcanizing combination is present in each strip, but when the two are brought together, a powerful vulcanizing combination is set up, with resultant acceleration of vulcanization by migration of the contained vulcanizing ingredients, as is well known in the art. For a more detailed understanding of the action of such combinations, reference may be made to the patent to Sidney M. Cadwell, No. 1,777,960, granted October 7, 1930.

The rubber strips A and B on the bands 10 and 11 may be subjected to the action of heaters such as indicated at 19 and 20 to aid drying. In advancing through the opposed portions 15 and 16 formed by the traveling bands 10 and 11, the films A and B will be brought into mutual contact and joined together by the natural tackiness of the rubber and will define a cross-section substantially as shown in Fig. 2, forming a plied strip. A powerful vulcanizing combination is thus set up in the plied strip.

Vulcanization may be further speeded by the application of heat from vulcanizers, as indicated at V, and the length of the run and/or speed of the bands 10 and 11 between the drums 13 and 14 may be varied to suit the particular conditions of operation and the nature of the vulcanizing ingredients used in the strips forming the plies. Preferably, conditions are maintained such that complete vulcanization of the plied strip is accomplished during passage between the opposed portions 15 and 16 of the traveling bands, that is, before they leave the bands.

After vulcanization the plied strip is transformed into a substantially round thread, as by coiling or folding transversely of its length. This transformation may be effected by means of a device, such as that indicated 21, consisting of a suitably shaped rigid sheath having a cross-sectional development from intake end 22 to outlet end 23 substantially as indicated in Figs. 2, 3 and 4, whereby the plied strip is curled into a thread 24. Upon leaving the forming device 21, the rubber thread 24 may be wrapped with fibrous material such as cotton or silk thread. For this purpose any suitable thread wrapping means may be employed. As an example, there may be provided a pair of spinners 25, through the centers of which the thread 24 passes, the spinners being mounted for rotation in opposite directions as by driving belts 26. Each spinner carries an eye 27 to guide the fibrous thread 28 as it is wrapped around the rubber thread 24 in opposite directions to provide a cover. The wrapped thread may then be accumulated upon a reel 29.

During wrapping it is preferred that the thread 24 be kept under tension. Accordingly, a pair of nip rolls 30 may be provided to engage the thread 24 beneath the spinners 25 to hold the thread stretched between said rolls and the drums 14, or, as an alternative, a second pair of nip rolls (not shown) may be provided in engagement with the thread between the forming device 21 and the spinners, and the rolls driven at appropriate speeds to hold the thread under tension.

If desired, vulcanizing means may be interposed between the thread forming device 21 and the spinners 25, in lieu of or in addition to the vulcanizers V, and conditions maintained such that the plied strip will enter the transforming device 21 in a tacky condition and will retain its threadlike form by adhesion of the folds or coils. Complete vulcanization may be effected at a subsequent stage, and, in this instance, the thread may or may not be provided with a fibrous cover.

The composition of the rubber compound may be widely varied and the vulcanizing treatment regulated as desired.

It is to be understood that the foregoing described embodiment is not to be considered limitative, since the invention is capable of being otherwise practiced without departing from the spirit thereof as defined in the following claims.

Having thus described my invention, what I claim and desire to protect by Letters Patent is:

1. The method of manufacturing rubber thread, which comprises forming from rubber compounds a plurality of strips of rubber comprising separately the complementary elements of a vulcanizing combination, associating said strips to form a plied strip, vulcanizing the strip, transforming said strip into a substantially round thread, and covering the thread with fibrous material.

2. The method of manufacturing rubber thread, which comprises forming a plied strip from a plurality of strips of rubber compound comprising separately the complementary elements of a vulcanizing combination, and transforming the plied strip into a substantially round thread.

3. The method of manufacturing rubber thread, which comprises forming a plurality of strips of rubber compound comprising separately the complementary elements of a vulcanizing combination, associating said strips to form a plied strip, and transforming the plied strip into a substantially round thread.

4. The method of manufacturing rubber thread, which comprises forming a plurality of strips of rubber compound comprising a vulcanizing combination, associating said strips to form a plied strip, and covering the plied strip with fibrous material to form a substantially round wrapped thread.

5. The method of manufacturing rubber thread, which includes the steps of plying a plurality of rubber strips, and transforming the plied strip into a substantially round thread.

6. The method of manufacturing rubber thread, which includes the steps of plying a plurality of rubber strips, and coiling the plied strip to form a substantially round thread.

7. The method of manufacturing rubber thread, which includes the steps of plying a plurality of rubber strips, and covering the plied strip with fibrous material to form a substantially round wrapped thread.

8. The method of manufacturing rubber thread, which comprises forming a plurality of rubber strips from liquid rubber compound, bringing the strips into mutual contact to form a plied strip and vulcanizing the same, coiling the plied strip into a substantially round thread, and covering the thread with fibrous material.

9. The method of manufacturing rubber thread, which comprises continuously forming a plurality of strips from liquid rubber composition, associating said strips in plied formation and vulcanizing the same, coiling the plied strip transversely of its length to form a thread, and covering said thread with fibrous material.

10. The method of manufacturing rubber thread, which comprises continuously forming a plurality of strips from liquid rubber composition, removing contained moisture from the strips, associating said strips to form a plied strip and vulcanizing the same, coiling the plied strip transversely of its length to form a substantially round thread, and covering the thread with fibrous material.

11. The method of manufacturing rubber thread, which comprises forming a plurality of strips from liquid rubber composition upon continuously advancing drying surfaces, joining said strips together in plied formation, vulcanizing the plied strip, transforming the plied strip into a substantially round thread, and covering the thread with fibrous material.

12. The method of manufacturing rubber thread, which comprises forming a plied strip from a plurality of rubber strips comprising separately the complementary elements of a vulcanizing combination, coiling said plied strip to form a thread, and covering the thread with fibrous material.

13. In combination, means for forming a plurality of rubber strips from rubber composition, means for associating said strips to form a plied strip, means for vulcanizing the plied strip, means for transforming said strip into a substantially round thread, and means for covering the thread with fibrous material.

14. In combination, means for forming a plurality of rubber strips from liquid rubber composition, means for plying said strips, means for vulcanizing the plied strip, means for coiling said plied strip transversely of its length to form a thread, and means for applying a fibrous cover to said thread.

15. In combination, a drier including continuously advancing drying surfaces, means for applying liquid rubber composition to the drying surfaces, means for bringing said films into mutual contact in the form of a plied strip, means for vulcanizing the plied strip, means for transforming said plied strip into a substantially round thread, and means for covering the thread with fibrous material.

ERNEST HOPKINSON.